(12) United States Patent
Yamaguchi et al.

(10) Patent No.: US 6,300,387 B2
(45) Date of Patent: Oct. 9, 2001

(54) MOLDING COMPOSITION

(75) Inventors: Takashi Yamaguchi; Tadashi Sakuma; Kuniyasu Kawabe, all of Wakayami (JP)

(73) Assignee: Kao Corporation, Tokyo (JP)

(*) Notice: Subject to any disclaimer, the term of this patent is extended or adjusted under 35 U.S.C. 154(b) by 0 days.

(21) Appl. No.: 09/789,508

(22) Filed: Feb. 22, 2001

(30) Foreign Application Priority Data

Feb. 22, 2000 (JP) .................................................. 12-043872

(51) Int. Cl.$^7$ ........................... C08F 2/46; C08F 283/04
(52) U.S. Cl. ........................... 522/60; 524/401; 524/450; 524/498; 525/391; 525/397; 525/425; 525/540; 522/104
(58) Field of Search .................... 524/401, 450, 524/498; 525/391, 397, 425, 540; 522/60, 104

(56) References Cited

U.S. PATENT DOCUMENTS

| | | | | |
|---|---|---|---|---|
| 4,237,244 | * | 12/1980 | von Harpe et al. | 525/171 |
| 4,777,204 | * | 10/1988 | Ikenaga et al. | 524/439 |
| 5,393,849 | * | 2/1995 | Srinivasan et al. | 525/425 |

FOREIGN PATENT DOCUMENTS

| | | |
|---|---|---|
| A5755962 | 4/1982 | (JP) . |
| A5169475 | 7/1993 | (JP) . |
| A071666 | 1/1995 | (JP) . |

* cited by examiner

*Primary Examiner*—Samuel A. Acquah
(74) *Attorney, Agent, or Firm*—Birch, Stewart, Kolasch & Birch, LLP

(57) ABSTRACT

A molding composition comprises (A) an aggregate, at least one of (B) an unsaturated polyester and (C) an unsaturated polyester-polyamide, and (D) a radical generator comprising a peroxide represented by formula:

$$R^1OOC(CH_3)_2{-}R^3{-}C(CH_3)_2OOR^2$$

wherein $R^1$ and $R^2$, which may be the same or different, each represent an alkyl group having 3 to 10 carbon atoms or an arylalkyl group having 7 to 17 carbon atoms; and $R^3$ represents an arylene group.

8 Claims, No Drawings

MOLDING COMPOSITION

FIELD OF THE INVENTION

This invention relates to a molding composition suitable for production of cores of automobile interior materials, sound absorbers of air conditioners, glass mat, constructional sound insulators, and the like.

BACKGROUND OF THE INVENTION

Cores of automobile interior materials, sound absorbers of air conditioners, glass mat, constructional sound insulators, and the like are produced from molding compounds mainly comprising fiber, a phenolic resin, and an amine curing agent to secure sufficient strength (see, for example, JP-A-57-55962 and JP-A-7-1666). However, phenolic resins react or decompose to produce formaldehyde, and the amine curing agent has the problem of smell.

Powdered molding compounds comprising a diallyl phthalate prepolymer and/or a crystalline unsaturated polyester resin, fiber, and a curing agent are known (see JP-A-5-169475). The diallyl phthalate prepolymer, however, has a low iodine value and fails to achieve a high crosslinking density, and generally used curing agent is used, so that the resulting molded article has insufficient strength.

SUMMARY OF THE INVENTION

An object of the present invention is to provide a molded article having sufficient strength and heat resistance for practical use and improved safety and smell.

Another object of the present invention is to provide a molding composition suitable for producing such a molded article.

The present invention relates to a molding composition comprising (A) an aggregate, at least one of (B) an unsaturated polyester and (C) an unsaturated polyester-polyamide, and (D) a radical generator, wherein the radical generator (D) comprises a peroxide represented by formula (I):

$$R^1OOC(CH_3)_2\text{—}R^3\text{—}C(CH_3)_2OOR^2 \quad (I)$$

wherein $R^1$ and $R^2$ which may be the same or different, each represent an alkyl group having 3 to 10 carbon atoms or an arylalkyl group having 7 to 17 carbon atoms; and $R^3$ represents an arylene group.

The invention also relates to a molded article obtained by molding the molding composition.

DETAILED DESCRIPTION OF THE INVENTION

According to the present invention, use of a specific peroxide as a radical generator provides a molded article with sufficient strength for practical use and free from the problems of formaldehyde generation and smell.

The aggregate as component (A) includes a fibrous material and wood. The fibrous material is not particularly limited and includes inorganic fibers such as glass fiber and organic fibers such as synthetic resin fibers and natural fibers. Organic fibers of cotton, flax, wool, silk, wood fiber, nylon, etc. are preferred from the standpoint of flexibility and heat insulation of a molded article. Inorganic fiber and organic fiber can be used in combination. Component (A) can be used in the form of yarn or fabric, either woven or nonwoven.

The unsaturated polyester as component (B) is not particularly limited as long as it has a radical polymerizable unsaturated bond. The monomers providing component (B) are not particularly limited and comprise a di- or higher polyhydric alcohol component, a carboxylic acid component, such as a di- or higher polycarboxylic acid or an anhydride or an ester thereof, and, if necessary, a radical polymerizable unsaturated group-containing monomer. The radical polymerizable unsaturated group-containing monomer is essentially required where neither the alcohol component nor the carboxylic acid component contains a radical polymerizable unsaturated bond.

The carboxylic acid component is preferably used in an amount of 0.9 to 1.1 mol, particularly 0.95 to 1.05 mol, per mole of the alcohol component.

Preferred dihydric alcohol components include a bisphenol A-alkylene oxide adduct (containing 2 to 4 carbon atoms in the alkylene moiety; average mole number of alkylene oxide added: 1 to 10), ethylene glycol, propylene glycol, 1, 6-hexanediol, 1, 4-butanediol, bisphenol A, and hydrogenated bisphenol A. Still preferred of them are a bisphenol A-alkylene oxide adduct (containing 2 or 3 carbon atoms in the alkylene moiety; average mole number of alkylene oxide added: 2 to 5), ethylene glycol, 1, 4-butanediol, and hydrogenated bisphenol A. The alkylene oxide to be added is preferably ethylene oxide or propylene oxide. Two or more kinds of alkylene oxides may be added. For example, bisphenol A added with ethylene oxide and propylene oxide is preferred.

Preferred tri- or higher polyhydric alcohol components include sorbitol, 1,4-sorbitan, pentaerythritol, glycerol, and trimethylolpropane, with glycerol and trimethylolpropane being still preferred.

The dicarboxylic acid components include various dicarboxylic acids and succinic acid which is substituted with an alkyl group having 1 to 20 carbon atoms or alkenyl group having 1 to 20 carbon atoms, anhydrides of these acids, and alkyl esters of these acids having 1 to 12 carbon atoms in the alkyl moiety thereof. Maleic acid, fumaric acid, terephthalic acid, and $C_{2-20}$ alkenyl-substituted succinic acid (e.g., octenylsuccinic anhydride or dodecenylsuccinic anhydride) are preferred.

Preferred tri- or higher polycarboxylic acids include 1,2, 4-benzenetricarboxylic acid (trimellitic acid), an anhydride thereof, and an alkyl ester thereof having 1 to 12 carbon atoms in the alkyl moiety.

The radical polymerizable unsaturated group-containing monomers include fumaric acid, maleic acid, maleic anhydride, and itaconic acid, with fumaric acid and maleic anhydride being preferred.

The unsaturated polyester-polyamide as component (C) is not particularly restricted as long as it has a radical polymerizable unsaturated bond. Component (C) can be obtained from a monomer mixture comprising an amine monomer in addition to the monomers used to prepare component (B). Examples of the amine monomers include various known polyamines, aminocarboxylic acids, amino alcohols, and lactams. Preferred amine monomers are metaxylenediamine, ethylenediamine, hexamethylenediamine, xylylenediamine, and ε-caprolactam.

It is desirable that each of components (B) and (C) be prepared from a monomer mixture comprising at least 20% by weight, particularly 30 to 70% by weight, especially 35 to 50% by weight, of at least one radical polymerizable unsaturated group-containing monomer based on the respective total constituent monomers. A molding composition comprising such components (B) and/or (C) exhibits satisfactory molding properties to provide a uniform molded article with further improved strength in ambient temperature and high temperature. The radical polymerizable unsaturated group-containing monomer(s) and the above-described other constituent monomers make 100% by weight. One or more kinds of component (B) and/or one or more kinds of component (C) can be used in combination.

Component (B) or component (C) can be prepared by allowing the respective monomer mixture to react at 150 to 250° C. for 5 to 20 hours in a nitrogen atmosphere. Component (B) and component (C) may be either a linear polymer or a nonlinear polymer. Since components (B) and (C) are used together with the radical generator (D) comprising a specific peroxide, the resulting molded and cured articles have increased hardness and strength as compared with those obtained with commonly employed radical generators. It is acceptable to use a monohydric alcohol component or a monocarboxylic acid component for molecular weight regulation, to use a generally used catalyst for esterification, such as dibutyltin oxide, for reaction acceleration. Additionally, polymerization inhibitor such as hydroquinone and t-butyl catechol may be used to prevent radical polymerization at condensation polymerization.

It is preferred for each of components (B) and (C) to have an iodine value of 40 or greater, still preferably 50 to 140, particularly 60 to 130, especially 70 to 130, to secure strength of molded articles. The iodine value is determined in accordance with JIS K0070.

It is preferred for each of components (B) and (C) to have a softening point of 80° C. or higher, particularly 80 to 130° C., for securing melting in molding and storage stability of the molding material. The softening point is measured with a Koka type flow tester manufactured by Shimadzu Corp. under conditions of a load of 196 N, an orifice diameter of 1 mm, an orifice length of 1 mm, and a rate of temperature rise of 3° C./min.

Of the polymers as component (B) or (C) those having crystallinity preferably have a melting point of 90° to 160° C. as a main temperature peak of the DSC curve measured at a heating rate of 10° C./min in an onset method and a melt viscosity of 100 Pa.s or less at a temperature higher than that melting point by 20° C. DSC is carried out with DSC210 supplied by Seiko Denshi K.K., and the melt viscosity is measured with a Koka type flow tester (supplied by Shimadzu Corp.) or a rheometer (supplied by Rheometrics Inc.).

The radical generator as component (D) comprises a peroxide represented by formula (I):

$$R^1OOC(CH_3)_2—R^3—C(CH_3)_2OOR^2 \qquad (I)$$

wherein $R^1$ and $R^2$, which may be the same or different, each represent an alkyl group having 3 to 10 carbon atoms or an arylalkyl group having 7 to 17 carbon atoms; and $R^3$ represents an arylene group.

In the formula (I), $R^1$ and $R^2$ each preferably represent an alkyl group having 3 to 6 carbon atoms. The aryl moiety of the arylalkyl group as $R^1$ and $R^2$ includes a phenyl group and a naphthyl group, wherein the phenyl or naphthyl group may be substituted with an alkyl group, etc. The arylene group as represented by $R^3$ preferably includes a phenylene group and preferably has a bond at the 1- and 3-positions of the benzene nucleus thereof. While the effect and action of the peroxide (I) as a radical generator used in the present invention has not been elucidated, it is effective in increasing the strength of the molded article.

Specific examples of the peroxide (I) are 1,3-di(2-isopropylperoxyisopropyl)benzene, 1,3-di(2-t-butylperoxyisopropyl)benzene, 1,3-di(2-t-amylperoxyisopropyl)benzene, 1,3-di(2-t-hexylperoxyisopropyl)benzene, 1,3-di(2-(1,1,3,3-tetramethylbutyl)peroxyisopropyl)benzene, 1,3-di(2-cumylperoxyisopropyl)benzene, and 1-(2-isopropylperoxyisopropyl)-3-(2-t-butylperoxyisopropyl) benzene, with 1,3-di(2-t-butylperoxyisopropyl)benzene being preferred.

The peroxide (I) can be used in combination with other known radical generators having a different half-life from that of the peroxide (I), selected from other peroxides, persulfates, azo compounds, and the like. Examples of suitable radical generators which can be used in addition to the peroxide (I) include benzoyl peroxide, lauroyl peroxide, di-t-butyl peroxide, dicumyl peroxide, t-butyl cumyl peroxide, and sodium persulfate. It is preferred for the radical generator as component (D) to have a half-life of 7 days or longer at 40° C. to secure the preservability, stability and the like of the molding composition. Taking the molding time into consideration, a still preferred half-life is within 10 minutes at 250° C.

If desired, the molding composition of the invention can contain known additives, such as a catalyst (e.g., triphenylphosphine), a curing aid (e.g., diallyl phthalate or triallyl phthalate), a lubricant (e.g., aliphatic acid amide wax, synthetic wax, latices, or fatty acid metal salts), a filler (e.g., talc, calcium carbonate or aluminum hydroxide), and so forth.

The compounding ratios of the components are not particularly limited as long as the molded articles obtained have sufficient strength for practical use. The language "sufficient strength for practical use" is intended to mean that the molded article has a normal temperature flexural strength of 100 kg/cm² or higher, preferably 120 kg/cm² or higher, as measured in accordance with JIS K6911. From the viewpoint of specific gravity and strength of the molded article, a preferred content of component (A) is 29 to 99% by weight, particularly 50 to 98.9% by weight, based on the total composition. A preferred total content of components (B) and (C) is 0.5 to 70% by weight, particularly 0.9 to 50% by weight, based on the total composition from the viewpoint of strength and specific gravity of the molded article. A preferred content of component (D) is 0.1 to 30% by weight, particularly 0.1 to 20% by weight, especially 0.1 to 5% by weight, based on the total composition, from the standpoint of molded article strength. The amounts of the additives optionally incorporated, such as a catalyst, a curing aid, a lubricant, and a filler, can be selected appropriately to obtain the desired effects.

The molding composition of the invention is prepared by compounding components (B) and/or (C), component (D) and necessary additives in a domestic mixer, a Henschel mixer, a fluidized bed mixer, and the like, and then mixing the mixture with component (A) by the method such as shaking up in a polyethylene bag as a simple method.

Known molding methods can be adopted with no particularly restriction for obtaining molded articles of the present invention from the above-mentioned molding composition, such as compression molding, laminated molding, injection molding, and extrusion. Prior to molding, the composition may be preheated by preliminary heating or by heating.

The molded article according to the invention exhibits sufficient strength for practical use and also satisfactory heat resistance and are therefore suited for use as cores of automobile interior materials, sound absorbers of air conditioners, glass mat, constructional sound insulators, and the like. The method of measuring the heat resistance will be described in Examples hereinafter given.

The present invention will now be illustrated in greater detail with reference to Preparation Examples and Examples, but it should be understood that the invention is not limited thereto.

Preparation Example 1

A mixture of 2450 g (7 mol) of a bisphenol A-propylene oxide (average number of moles added: 2.1) adduct, 1200 g (5 mol) of hydrogenated bisphenol A, 496 g (8 mol) of ethylene glycol, 2000 g (20.4 mol) of maleic anhydride, 16 g of dibutyltin oxide, and 0.6 g of hydroquinone was allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a linear unsaturated polyester resin having an iodine value of 70.2 and a softening point of 110° C. The resin was designated resin 1.

Preparation Example 2

A mixture of 975 g (3 mol) of a bisphenol A-ethylene oxide (average number of moles added: 2.1) adduct, 1200 g (5 mol) of hydrogenated bisphenol A, 540 g (6 mol) of 1,4-butanediol, 1400 g (14.3 mol) of maleic anhydride, and 0.4 g of hydroquinone was allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a linear unsaturated polyester resin having an iodine value of 73.6 and a softening point of 105° C. The resin was designated resin 2.

Preparation Example 3

A mixture of 310 g (5 mol) of ethylene glycol, 1200 g (5 mol) of hydrogenated bisphenol A, 980 g (10 mol) of maleic anhydride, 192 g (1 mol) of trimellitic anhydride, and 0.4 g of hydroquinone was allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a nonlinear unsaturated polyester resin having an iodine value of 81.1 and a softening point of 110° C. The resin was designated resin 3.

Preparation Example 4

A mixture of 650 g (2 mol) of a bisphenol A-ethylene oxide (average number of moles added: 2.1) adduct, 124 g (2 mol) of ethylene glycol, 1200 g (5 mol) of hydrogenated bisphenol A, 136 g (1 mol) of metaxylenediamine, 1009 g (10.3 mol) of maleic anhydride, and 0.4 g of hydroquinone was allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a linear unsaturated polyester resin having an iodine value of 69.1 and a softening point of 115° C. The resin was designated resin 4.

Preparation Example 5

A mixture of 2450 g (7 mol) of a bisphenol A-propylene oxide (average number of moles added: 2.1) adduct, 1200 g (5 mol) of hydrogenated bisphenol A, 496 g (8 mol) of ethylene glycol, 2366 g (20.4 mol) of fumaric acid, 8 g of dibutyltin oxide, and 0.6 g of hydroquinone was allowed to react at 160° C. for 4 hours in a nitrogen atmosphere. The temperature was raised up to 200° C., and the reaction was continued under atmospheric pressure for 1 hour and then under reduced pressure of 9.33 kPa for another 1 hour. The resulting resin was found to be a linear unsaturated polyester resin having an iodine value of 72.1 and a softening point of 103° C. The resin was designated resin 5.

Examples 1 to 5 and Comparative Examples 1 to 2

Each of the resins prepared in Preparation Examples 1 to 5, being ground to powder having a particle size of 30 to 200 µm (component (B) or component (C)), a organic fibrous material in the form of pieces of threads (component (A)), and the radical generator (component (D)) shown in Table 1 below were compounded to prepare a molding compound.

The various components except component (A) were mixed by Henschel mixer in the ratio set forth in Table 1, and then component (A) in the ratio set forth in Table 1 was mixed with the mixture in a polyethylene bag to prepare a molding compound.

The compound was put in between mirror-finished stainless steel plates, placed in a hot press set at 190° C. and hot pressed under a contact pressure of 1.47 MPa for 1 minute to obtain a 20 cm long, 5 cm wide and 6 mm thick plate.

The resulting plate was evaluated in a normal temperature flexural strength test in accordance with JIS K6911. Further, the plate was subjected to 120° C. heat resistance evaluation. The results obtained are shown in Table 1. In any case no irritating smell was generated in the 120° C. heat resistance evaluation. Further, when the molded article was kept in a desiccator for 24 hours, and the gas was then sucked from the desiccator, no formaldehyde was detected with a formalin gas detection tube.

In the 120° C. heat resistance evaluation, the molded plate was left to stand in an oven at 120° C. for 2 hours with a 20 g weight put on the center thereof. The plate taken out of the oven was placed on a horizontal mount with the center being in contact with the mound, and the warpage (the distance of the periphery from the mount) was measured. The heat resistance was rated on an A-to-D scale according to the warpage.

A . . . No warpage.
B . . . The warpage is less than 1 mm.
C . . . The warpage is less than 2.5 mm.
D . . . The warpage is 2.5 mm or more.

TABLE 1

| | Composition of Molding Compound (part by weight) | | | | | | | | | Normal Temp. Flexural strength ($kg/cm^2$) | 120° C. Heat Resistance |
| | | (B) and/or (C) | | | | | (D)* | | | | |
| | (A) | Resin 1 | Resin 2 | Resin 3 | Resin 4 | resin 5 | RG-1 | RG-2 | RG-3 | | |
|---|---|---|---|---|---|---|---|---|---|---|---|
| Example 1 | 80 | 19 | — | — | — | — | 1.0 | — | — | 160 | A |
| Example 2 | 80 | — | 19 | — | — | — | 0.8 | 1.0 | — | 150 | A |
| Example 3 | 80 | — | — | 19 | — | — | 1.0 | — | — | 165 | A |
| Example 4 | 80 | — | — | — | 19 | — | 1.0 | — | — | 155 | A |
| Example 5 | 80 | — | — | — | — | 19 | 0.6 | — | — | 160 | A |
| Compara. Example 1 | 80 | 19 | — | — | — | — | — | 2.5 | — | 95 | B |
| Compara. Example 2 | 80 | — | 19 | — | — | — | — | — | 1.0 | 105 | B |

Note:
*RG-1: 1,3-di (2-t-butylperoxyisopropyl) benzene (Luperox 802, available from Atchem Yoshitomi)
RG-2: n-butyl 4,4-di (t-butylperoxy) valerate (40% on silica) (Trigonox 17/40, available from Kayaku Akzo)
RG-3: dicumyl peroxide (Percumyl D, available from NOF Corp.)

It is seen from the results in Table 1 that all the molded plates of Examples 1 to 5 have sufficient strength and heat resistance for practical use as compared with those of Comparative Examples 1 and 2.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth.

What is claimed is:

1. A molding composition comprising:
   (A) an aggregate;
     at least one of (B) an unsaturated polyester and (C) an unsaturated polyester-polyamide; and
   (D) a radical generator,
     wherein said radical generator (D) comprises a peroxide represented by formula:

$R^1OOC(CH_3)_2—R^3—C(CH_3)_2OOR^2$
   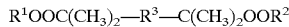

wherein $R^1$ and $R^2$ which are the same or different, each represent an alkyl group having 3 to 10 carbon atoms or an arylalkyl group having 7 to 17 carbon atoms, and $R^3$ represents an arylene group.

2. The molding composition according to claim 1, wherein said component (A) is a fibrous material.

3. The molding composition according to claim 1, wherein said components (B) and (C) each have a softening point of 80 to 130° C.

4. The molding composition according to claim 1, wherein said components (B) and (C) each have an iodine value of 50 to 140.

5. The molding composition according to claim 1, wherein said components (B) and (C) each comprise 30 to 70% by weight of at least one radical polymerizable unsaturated group-containing monomer unit based on the respective total monomers.

6. The molding composition according to claim 1, wherein $R^1$ and $R^2$ each represent an alkyl group having 3 to 6 carbon atoms.

7. The molding composition according to claim 1, which comprises 29 to 99% by weight of component (A), 0.5 to 70% by weight, in total, of components (B) and (C), and 0.1 to 30% by weight of component (D).

8. A molded article obtained by molding the molding composition according to claim 1.

* * * * *